United States Patent [19]

Clampitt et al.

[11] E Re. 29,716

[45] Reissued * Aug. 1, 1978

[54] METHOD OF DRILLING A BOREHOLE USING GELLED POLYMERS

[75] Inventors: Richard L. Clampitt; James E. Hessert, both of Bartlesville, Okla.

[73] Assignee: Phillips Petroleum Company, Bartlesville, Okla.

[ * ] Notice: The portion of the term of this patent subsequent to Sep. 30, 1992, has been disclaimed.

[21] Appl. No.: 799,611

[22] Filed: May 23, 1977

Related U.S. Patent Documents

Reissue of:

[64] Patent No.: 3,921,733
Issued: Nov. 25, 1975
Appl. No.: 372,825
Filed: Jun. 22, 1973

U.S. Applications:

[63] Continuation-in-part of Ser. No. 224,914, Feb. 9, 1972, abandoned.

[51] Int. Cl.[2] ..... C09K 7/00; E21B 21/00; E21B 43/22

[52] U.S. Cl. ..... 175/65; 166/270; 166/294; 252/8.5 A; 252/8.5 C

[58] Field of Search ..... 166/294, 295, 270, 276, 166/281, 273–275; 175/65; 252/8.5 A, 8.5 C, 8.55 D, 316

[56] References Cited

U.S. PATENT DOCUMENTS

| | | | |
|---|---|---|---|
| 3,020,953 | 2/1962 | Zerweck et al. | 166/275 X |
| 3,039,529 | 6/1962 | McKennon | 166/275 |
| 3,243,000 | 3/1966 | Patton et al. | 175/65 |
| 3,265,657 | 8/1966 | Sinclair | 252/316 |
| 3,336,979 | 8/1967 | Ingraham et al. | 166/294 X |
| 3,502,149 | 3/1970 | Pence, Jr. | 166/295 |
| 3,658,129 | 4/1972 | Lanning et al. | 166/294 |
| 3,687,200 | 8/1972 | Rouston | 166/295 X |
| 3,699,042 | 10/1972 | Browning et al. | 252/8.5 C |
| 3,701,384 | 10/1972 | Rouston et al. | 166/281 X |
| 3,749,172 | 7/1973 | Hessert et al. | 166/270 X |
| 3,757,863 | 9/1973 | Clampitt et al. | 166/270 |
| 3,900,406 | 8/1975 | Clampitt et al. | 252/8.55 D |
| 3,909,423 | 9/1975 | Hessert et al. | 166/270 X |

*Primary Examiner*—Stephen J. Novosad

[57] ABSTRACT

Improvements in secondary recovery operations for the recovery of oil, and improvements in well drilling operations, are accomplished through the use of aqueous mediums comprising aqueous gels prepared from water and certain polymers such as polyacrylamides and related polymers.

14 Claims, No Drawings

METHOD OF DRILLING A BOREHOLE USING GELLED POLYMERS

Matter enclosed in heavy brackets [ ] appears in the original patent but forms no part of this reissue specification; matter printed in italics indicates the additions made by reissue.

This [application] is a *Reissue of application Ser. No. 372,825, filed Jun. 22, 1973, now U.S. Pat. No. 3,921,733 which is a* continuation-in-part of [my copending] application Ser. No. 224,914, filed Feb. 9, 1972, now abandoned.

This invention relates to methods of preparing and using aqueous gels prepared from polyacrylamides and related polymers.

The secondary recovery of oil from oil-bearing or containing subterranean formations by fluid drive processes wherein a fluid is injected into the formation via one or more injection wells to drive the oil through the formation to one or more production wells is a well known process. Fluids used in such processes include liquids, such as water and various hydrocarbons, and gases such as hydrocarbon gases, carbon dioxide, etc. Many oil reservoirs comprise layers or zones of porous rock which can vary in permeability from more than 1,000 millidarcys to less than 10 millidarcys. In all fluid drive processes a recognized problem is the predilection of the drive fluid to channel along or through the more permeable zones of the formation. This is commonly referred to as fingering. The more conductive zones, after the oil has been largely displaced therefrom, function as "thief zones" which permit the drive fluid to channel directly from injection to production wells. In many instances, such channeling or fingering results in leaving substantial quantities of oil in the less permeable zones of the formation which are bypassed. Such channeling or fingering can occur when the mobility, i.e., the quotient of the reservoir's permeability to the drive fluid divided by the viscosity of the drive fluid, becomes large relative to the mobility of the reservoir oil.

Drilling fluids used in the drilling of oil wells, gas wells, and similar boreholes are commonly aqueous liquids containing clays or other colloidal materials. The drilling fluid serves as a lubricant for the bit and drill stem, as a carrying medium for the cuttings produced by the drill bit, and assists in the formation of a filter cake on the wall of the borehole for the reduction of fluid losses to the surrounding subsurface strata. It is known that excessive viscosity in the drilling fluid has an adverse effect on the penetration rate obtained by the drill bit. In many instances, substantially better rates can be secured by eliminating colloidal materials and reducing the viscosity of the drilling fluid. In some instances, air, clear water, or another similar fluid of low viscosity can be used in the place of the ordinary drilling fluid or mud.

The present invention provides a solution for the above-described problems. I have now discovered that certain aqueous gels, described hereinafter, can comprise at least a portion of the aqueous medium used in said secondary recovery operations, and the aqueous medium used in said well drilling operations. Said gels are prepared from certain water-dispersible polymers, e.g., polyacrylamides, which when used in combination with a water-soluble compound of a polyvalent metal which can be reduced to a lower polyvalent valence state and a suitable reducing agent capable of reducing said polyvalent metal to said lower polyvalent valence state, can be used as gelling agents to gel aqueous mediums comprising water. By varying the composition and/or amounts of said gelling agents, and/or the conditions under which they are used in forming the gels, a wide range of aqueous gels ranging from liquid highly mobile gels to thick, viscous, somewhat elastic gels can be produced.

Said aqueous gels are particularly useful in operations wherein a fluid medium is introduced into a borehole in the earth, e.g., in the above-described secondary operations, in the above-described well drilling operations, in well completion operations, as packer fluids, etc.

Thus, according to the invention, there is provided, in a method wherein a fluid medium is introduced into a borehole in the earth and into contact with a subterranean formation penetrated by said borehole, the improvement wherein at least a portion of said fluid medium comprises an aqueous gel, and wherein said gel comprises water to which there has been added: a water-thickening amount of a water-dispersible polymer selected from the group consisting of: polyacrylamides and polymethacrylamides wherein up to about 75 percent of the carboxamide groups can be hydrolyzed to carboxyl groups; crosslinked polyacrylamides and crosslinked polymethacrylamides wherein up to about 75 percent of the carboxamide groups can be hydrolyzed to carboxyl groups; polyacrylic acid and polymethacrylic acid; polyacrylates; polymers of N-substituted acrylamides wherein the nitrogen atoms in the carboxamide groups can have from 1 to 2 alkyl substituents which contain from 1 to 4 carbon atoms; copolymers of acrylamide with another ethylenically unsaturated monomer copolymerizable therewith, sufficient acrylamide being present in the monomer mixture to impart said water-dispersible properties to the resulting copolymer when it is mixed with water, and wherein up to about 75 percent of the carboxamide groups can be hydrolyzed to carboxyl groups; and mixtures of said polymers; a sensible amount of a water-soluble compound of a polyvalent metal wherein the metal present is capable of being reduced to a lower polyvalent valence state and which is sufficient to gel said water when the valence of at least a portion of said metal is reduced to said lower valence state; and an amount of a water-soluble reducing agent which is effective to reduce at least a portion of said metal to said lower valence state.

Still further according to the invention, there is provided a method for producing an aqueous gel, which method comprises: thickening water by adding thereto at least 0.1 weight percent, based on the weight of said water, of a water-dispersible polymer selected from the group consisting of: polyacrylamides and polymethacrylamides wherein up to about 75 percent of the carboxamide groups can be hydrolyzed to carboxyl groups; crosslinked polyacrylamides and crosslinked polymethacrylamides wherein up to about 75 percent of the carboxamide groups can be hydrolyzed to carboxyl groups; polyacrylic acid and polymethacrylic acid; polyacrylates; polymers of N-substituted acrylamides wherein the nitrogen atoms in the carboxamide groups can have from 1 to 2 alkyl substituents which contain from 1 to 4 carbon atoms; copolymers of acrylamide with another ethylenically unsaturated monomer copolymerizable therewith, sufficient acrylamide being present in the monomer mixture to impart said water-dispersible properties to the resulting copolymer when it is mixed with water, and wherein up to about 75 percent of the carboxamide groups can be hydrolyzed to carboxyl groups; and mixtures of said polymers; gelling the so-thickened water by adding thereto an amount of a water-soluble compound of a polyvalent metal wherein the valence state of the metal therein is capable of being reduced to a lower polyvalent valence state and which is sufficient to supply at least about $3 \times 10^{-6}$ gram atoms of said polyvalent metal per gram of said polymer, and an amount of a water-soluble reducing agent which is effective to reduce at least a portion of said metal to said lower valence state; and then diluting the resulting concentrated gel with sufficient water to reduce the concentration of said polymer to a final desired diluted concentration. Said final diluted concentration can be any concentration suitable for the intended use of the gel, e.g. a concentration within the range of from about 10 to 90 percent of said concentrated gel.

Herein and in the claims, unless otherwise specified, the term "polymer" is employed generically to include both homopolymers and copolymers; and the term "water-dispersible polymers" is employed to include those polymers which are truly water-soluble and those polymers which are dispersible in water or other aqueous medium to form stable colloidal suspensions which can be gelled as described herein.

Polymers which can be used in the practice of the invention include the various polyacrylamides and related polymers which are water-dispersible and which can be used in an aqueous medium, with the gelling agents described herein, to give an aqueous gel. Presently preferred polymers include the various substantially linear homopolymers and copolymers of acrylamide and methacrylamide. By substantially linear it is meant that the polymers are substantially free of crosslinking between the polymer chains. Said polymers can have up to about 75, preferably up to about 45, percent of the carboxamide groups hydrolyzed to carboxyl groups. As used herein and in the claims, unless otherwise specified, the term "hydrolyzed" includes modified polymers wherein the carboxyl groups are in the acid form and also such polymers wherein the carboxyl groups are in the salt form, provided said salts are water-dispersible. Such salts include the ammonium salts, the alkali metal salts, and others which are water-dispersible. Hydrolysis can be carried out in any suitable fashion, for example, by heating an aqueous solution of the polymer with a suitable amount of sodium hydroxide.

Substantially linear polyacrylamides can be prepared by methods known in the art. For example, the polymerization can be carried out in aqueous medium, in the presence of a small but effective amount of a water-soluble oxygen-containing catalyst, e.g., a thiosulfate or bisulfate of potassium or sodium or an organic hydroperoxide, at a temperature between about 30° and 80° C. The resulting polymer is recovered from the aqueous medium, as by drum drying, and can be subsequently ground to the desired particle size. A presently preferred particle size is such that about 90 weight percent will pass through a number 10 mesh sieve, and not more than about 10 weight percent will be retained on a 200 mesh sieve (U.S. Bureau of Standards Sieve Series).

Included among the copolymers which can be used in the practice of the invention are the water-dispersible copolymers resulting from the polymerization of a major proportion of acrylamide or methacrylamide and a minor proportion of an ethylenically unsaturated monomer copolymerizable therewith. It is desirable that sufficient acrylamide or methacrylamide be present in the monomers mixture to impart to the copolymer the above-described water-dispersible properties, for example, from about 90 to 99 percent acrylamide and from about 1 to 10 percent other ethylenically unsaturated monomers. Such other monomers include acrylic acid, methacrylic acid, vinylsulfonic acid, vinylbenzylsulfonic acid, vinylbenzenesulfonic acid, vinyl acetate, acrylonitrile, methyl acrylonitrile, vinyl alkyl ether, vinyl chloride, maleic anhydride, and the like. Various methods are known in the art for preparing said copolymers. For example, see U.S. Pat. Nos. 2,625,529; 2,740,522; 2,729,557; 2,831,841; and 2,909,508. Said copolymers can also be used in the hydrolyzed form, as discussed above for the homopolymers.

Polyacrylic acids, including polymethacrylic acid, prepared by methods known in the art, can also be used in the practice of the invention.

Polyacrylates, e.g., as described in Kirk-Othmer, "Encyclopedia of Chemical Technology", vol. 1, second edition, pages 305et seq., Interscience Publishers, Inc. New York (1963), can also be used in the practice of the invention. Examples of said polyacrylates include polymers of methyl acrylate, ethyl acrylate, n-propyl acrylate, isopropyl acrylate, n-butyl acrylate, isobutyl acrylate, tert-butyl acrylate, n-octyl acrylate, and the like.

Polymers of N-alkyl-substituted acrylamides wherein the nitrogen atoms in the carboxamide groups can have from 1 to 2 alkyl substituents which contain from 1 to 4 carbon atoms can also be used in the practice of the invention. Examples of said N-substituted acrylamides include, among others, N-methyl acrylamide, N-propyl acrylamide, N-butyl acrylamide, N,N-dimethyl acrylamide, N-methyl-N-sec-butyl acrylamide, and the like, at various stages of hydrolysis, as described above.

Crosslinked polyacryalmides and crosslinked polymethacrylamides, at various stages of hydrolysis as described above, can also be used in the practice of the invention. In general, said crosslinked polyacrylamides can be prepared by the methods described above, but including in the monomeric mixture a suitable amount of a suitable crosslinking agent. Examples of crosslinking agents include methylenebisacrylamide, divinylbenzene, vinyl ether, divinyl ether, and the like. Said crosslinking agents can be used in small amounts, e.g., up to about 1 percent by weight of the monomeric mixture. Such crosslinking is to be distinguished from any crosslinking which occurs when solutions of polymers are gelled as described herein.

Mixtures of the above-described polymers can also be used in the practice of the invention. All the polymers useful in the practice of the invention are characterized by high molecular weight. The molecular weight is not critical so long as the polymer has the above-described water-dispersible properties. It is preferred that the polymer have a molecular weight of at least 100,000. The upper limit of molecular weight is unimportant so long as the polymer is water-dispersible, and the aqueous gel prepared therefrom can be pumped. Thus, polymers having molecular weights as high as 20,000,000 or higher, and meeting said conditions, can be used.

The amount of said polymers used in the practice of the invention can vary widely depending upon the particular polymer used, the purity of said polymer, and properties desired in said aqueous gels. In general, the amount of polymer used will be a water-thickening amount, i.e., at least an amount which will significantly thicken the water to which it is added. For example, amounts in the order of 25 to 100 parts per million weight (0.0025 to 0.01 weight percent) have been found to significantly thicken water. For example, distilled water containing 25 ppm of a polyacrylamide having a molecular weight of about $10 \times 10^6$ has a viscosity increase of about 41 percent. At 50 ppm the viscosity increase is about 106 percent. At 10 ppm the viscosity increase is about 347 percent. As another example, distilled water containing 25 ppm of a polyacrylamide having a molecular weight of about $3.5 \times 10^6$ has a viscosity increase of about 23 percent. At 50 ppm the viscosity increase is about 82 percent. At 100 ppm the viscosity increase is about 241 percent. Generally speaking, amounts in the range of from 0.0025 to 5, preferably from 0.01 to 1.5, more preferably 0.025 to 0.4, weight percent, based on the weight of water, can be used. However, amounts outside said ranges can be used. In general, with the proper amounts of polyvalent metal and reducing agent, the amount of polymer used will determine the consistency of the gel obtained. Small amounts of polymer will usually produce liquid mobile gels which can be readily pumped whereas large amounts of polymer will usually produce thick, viscous, somewhat elastic gels. If desired, said thick gels can be "thinned" by dilution with water to any desired concentration of polymer. This can be done by mechanical means, e.g., stirring, pumping, or by means of a suitable turbulence inducing device to cause shearing, such as a jet nozzle. Thus, there is really no fixed upper limit on the amount of polymer which can be used.

However, I have discovered that when a liquid mobile gel is desired, it is definitely preferred to first prepare a concentrated gel and dilute the more concentrated gels before they become too viscous. In general, dilute gels are more difficult to prepare in that, for one thing, gelling times are longer. More importantly for some reason not yet completely understood, the gels are usually more effective in their intended uses when a concentrated gel is first prepared and then diluted to the desired concentration. Another advantage is that, in general, less gelling agents are required for a given viscosity.

Metal compounds which can be used in the practice of the invention are water-soluble compounds of polyvalent metals wherein the metal is present in a valence state which is capable of being reduced to a lower polyvalent valence state. Examples of such compounds include potassium permanganate, sodium permanganate, ammonium chromate, ammonium dichromate, the alkali metal chromates, the alkali metal dichromates, and chromium trioxide. Sodium dichromate and potassium dichromate, because of low cost and ready availability, are the presently preferred metal-containing compounds for use in the practice of the invention. The hexavalent chromium in said chromium compounds is reduced in situ to trivalent chromium by suitable reducing agents, as discussed hereinafter. In the permanganage compounds the manganese is reduced from +7 valence to +4 valence as in $MnO_2$.

The amount of said metal-containing compounds used in the practice of the invention will be a sensible amount, i.e., a small but finite amount which is more than incidental impurities, but which is effective or sufficient to cause subsequent gelation when the metal in the polyvalent metal compound is reduced to a lower polyvalent valence state. The lower limit of the concentration of the starting metal-containing compound will depend upon several factors including the particular type of polymer used, the concentration of the polymer in the water to be gelled, the water which is used, and the type of gel product desired. For similar reasons, the upper limit on the concentration of the starting metal-containing compound also cannot always be precisely defined. However, it should be noted that excessive amounts of the starting metal compound, for example +6 chromium, which can lead to excessive amounts of +3 chromium when there is sufficient reducing agent present to reduce the excess +6 chromium, can adversely affect the stability of the gels produced. As a general guide, the amount of the starting polyvalent metal-containing compound used in preparing aqueous gels in accordance with the invention will be in the range of from 0.05 to 60, preferably 0.5 to 30, weight percent of the amount of the polymer used. Stated another way, the amount of the starting polyvalent metal-containing compound used will usually be an amount sufficient to provide at least about $3 \times 10^6$, preferably at least $3 \times 10^5$, gram atoms of said metal capable of being reduced per gram of polymer. Preferably, the amount of said metal capable of being reduced which is used will not exceed $4 \times 10^3$, more preferably $2 \times 10^3$, gram atoms of said metal per gram of polymer. However, in some situations it may be desirable to use amounts of the starting polyvalent metal-containing compound which are outside the above ranges. Such use is within the scope of the invention. Those skilled in the art can determine the amount of starting polyvalent metal-containing compound to be used by simple experiments carried out in the light of this disclosure. For example, when brines, such as are commonly available in producing oil fields, are used in the water in preparing gels for use in the practice of the invention, less of the starting polyvalent metal-containing compound is required than when distilled water is used. Stable gels have been prepared using brines having a wide range of dissolved solids contents, e.g., from 850, 1,200, 6,000, and 60,000 ppm total dissolved solids, depending upon the particular polymer and brine used. Gelation rates are frequently faster when using said brines. Such oil field brines commonly contain varying amounts of sodium chloride, calcium chloride, magnesium chloride, etc. Sodium chloride is usually present in the greatest concentration. The word "water" is used generically herein and in the claims, unless otherwise specified, to include such brines, fresh water, and other aqueous media which can be gelled in accordance with the invention.

Water having a low (or essentially none) total dissolved solids content is the preferred medium for preparing the gels described herein. Preferably, when brines are used the total dissolved solids content should not be greater than about 60,000, more preferably not greater than about 40,000 ppm, by weight. Of said total dissolved solids, the amount of polyvalent metal ions such as calcium, magnesium, etc., should preferably not be greater than about 6,000, more preferaly not greater than about 3,000 ppm by weight.

Suitable reducing agents which can be used in the practice of the invention include sulfur-containing compounds such as sodium sulfite, sodium hydrosulfite, sodium metabisulfite, potassium sulfite, sodium bisulfite, potassium metabisulfite, sodium sulfide, sodium thiosulfate, ferrous sulfate, thioacetamide, hydrogen sulfide, and others; and nonsulfur-containing compounds such as hydroquinone, ferrous chloride, p-hydrazinobenzoic acid, hydrazine phosphite, hydrazine dichloride, and others. Some of the above reducing agents act more quickly than others, for example, sodium thiosulfate usually reacts slowly in the absence of heat, e.g., heating to about 125°-130° F. The presently most preferred reducing agents are sodium hydrosulfite or potassium hydrosulfite.

The amount of reducing agent to be used in the practice of the invention will be a sensible amount, i.e., a small but finite amount which is more than incidental impurities, but which is effective or sufficient to reduce at least a portion of the higher valence metal in the starting polyvalent metal-containing compound to a lower polyvalent valence state. Thus, the amount of reducing agent to be used depends, to some extent at least, upon the amount of the starting polyvalent metal-containing compound which is used. In many instances, it will be preferred to use an excess of reducing agent to compensate for dissolved oxygen in the water, exposure to air during preparation of the gels, and possible contact with other oxidizing substances such as might be encountered in field operations. As a general guide, the amount of reducing agent used will generally be within the range of from 0.1 to at least 150, preferably at least about 200, weight percent of the stoichiometric amount required to reduce the metal in the starting polyvalent to said lower polyvalent valence state, e.g., +6 Cr to +3 Cr. However, in some instances, it may be desirable to use amounts of reducing agent outside said ranges. The use of such amounts is within the scope of the invention. Those skilled in the art can determine the amount of reducing agent to be used by simple experiments carried out in the light of this disclosure.

Various methods can be used for preparing the aqueous gels used in the practice of the invention. Either the metal-containing compound or the reducing agent can be first added to a solution or dispersion of the polymer in water or other aqueous medium, or said metal-containing compound and said reducing agent can be added simultaneously to the solution or aqueous medium containing the polymer. Generally speaking, where convenient, the preferred method is to first disperse the polymer in the water or other aqueous medium. The reducing agent is then added to the dispersion of polymer, with stirring. The metal-containing compound is then added to the solution or aqueous medium containing the polymer and the reducing agent, with stirring. Gelation starts as soon as reduction of some of the higher valence metal in the starting polyvalent metal-containing compound to a lower valence state occurs. The newly formed lower valence metal ions, for example +3 chromium obtained from +6 chromium, effect rapid cross-linking of the polymer and gelation of the solution or aqueous medium containing same.

In another method, the aqueous gels can be formed in situ in the formation to be treated. This method is useful when the reducing agent is a reducing gas such as hydrogen sulfide or a hydrogen sulfide containing gas. The reducing gas can be naturally occurring in the formation or can be introduced into the formation. Thus, the polymer can be dispersed in water and the metal-containing compound added to the resulting dispersion. Said dispersion is then pumped into contact with said formation. Upon contacting the reducing gas, either naturally occurring or injected following the injection of said dispersion, the metal in the metal-containing compound will be reduced, e.g., $Cr^{+6}$ to $Cr^{+3}$, and gelation will be effected. If desired, the gel can then be moved through said formation by the subsequent injection of a drive fluid, e.g., water.

It is also within the scope of the invention to prepare a dry mixture of the polymer, the metal-containing compound and the reducing agent, in proper proportions, and then add this dry mixture to the proper amount of water.

An advantage of the invention is that ordinary ambient temperatures and other conditions can be used in practically all instances in preparing the aqueous gels used in the practice of the invention or aqueous mediums containing same. However, in some instances, a small amount of heat may be desirable to aid in the formation of the gel, e.g., heating to a temperature of about 125°-130° F.

Aqueous gels used in the practice of the invention can be prepared having a wide range of viscosities or firmness ranging from low viscosity or highly mobile gels having a relatively low viscosity up to thick, viscous, somewhat elastic gels which are relatively nonmobile. The choice of gel viscosity or concentration will depend upon the use to be made of the gel. For example, when the gel is to be used in a fluid drive operation for the secondary recovery of oil, or otherwise injected into the pores of a nonfractured porous media, the gel viscosity or concentration can have any value which will permit the gel to be injected into said pores for the intended purpose. The actual viscosity and/or gel strength of the gel will depend upon the type and concentration of the polymer, the type and amount of starting polyvalent metal compound used, and the type and amount of reducing agent used.

One presently preferred procedure is to prepare a relatively concentrated or high viscosity gel and dilute same to a viscosity or concentration suited for the actual use of the gel. In many instances, this procedure results in a more stable gel, in addition to the advantages mentioned above.

When employing said dilution technique a starting solution or dispersion of polymer containing, for example, 1,000 to 10,000 ppm (0.1 to 1 wt. %) or more of polymer can be used. This solution or dispersion is then gelled by the addition of suitable amounts of polyvalent metal compound and reducing agent. After gelation has proceeded to the desired extent, the resulting gel can be diluted with water to the concentration or viscosity most suited for its intended use. For example, if the gel is to be used in a waterflood operation, it could be diluted to a nominal 4,000, 2,500, 1,000, 500, 250, or less, ppm gel by the addition of a suitable amount of water. The more concentrated polymer solutions or dispersions usually have a faster rate of gelation. Thus, in most instances, it will be preferred to carry out the dilution soon after the components of the gel have been added to the water or other aqueous medium, e.g., within about 5 to 30 minutes. Preferably, the concentration of the polymer in the "concentrated gel" will be at least twice that in the final gel. Dilution of the gel retards the rate of gelation. Thus, this dilution technique can be employed to control the gelation rate, if desired. In many instances, gels prepared by employing said dilution technique are more stable. Another advantage of said dilution technique is that it is usually more convenient to weigh out and handle the larger quantities of reagents.

I am aware that chromium ions having a valence of +3 have been used to react with water-dispersible polymers such as polyacrylamides and polysaccharides. See, for example, U.S. Pat. No. 3,114,651 to Gentile and U.S. Pat. No. 3,383,307 to Goetz. In such processes the chromium compound is added in a form wherein the chromium has an initial valence of +3, e.g., $CrCl_3$, $Cr(NO_3)_3$, etc. In the practice of the present invention, the $Cr^{+3}$ ions must be newly formed, e.g., nascent ions formed in situ in the solution to be gelled by the reduction of $Cr^{+6}$ ions to $Cr^{+3}$ ions. I have found that aqueous gels of polymer solutions prepared using such newly formed $Cr^{+3}$ ions have much better long term stability than do gels prepared by the direct addition of $Cr^{+3}$ ions.

Gel instability is evidenced by precipitation and/or syneresis (bleeding or water separation). A severe test of gel stability is to prepare the gel and merely allow it to stand. I have found that gels which are stable for as long as 48 hours are usually stable for a month or longer. I have also found that formation solids such as sandstone and limestone improve gel stability.

Generally speaking, the pH of the final solution of the gelling reagents is preferably less than 7, more preferably in the order of 6. In general, pH is not controlling, but higher pH values retard gelation rate. In general, the pH of the gelling solution will depend upon the reducing agent used. If desired, the pH can be adjusted by the addition of a suitable acid, depending upon the reducing agent used.

Herein and in the claims, unless otherwise specified, the aqueous gels used in the practice of the invention are defined for convenience, and not by way of limitation, in terms of the amount of polymer contained therein, irrespective of whether or not all the polymer has entered into the gel-forming reaction. For example, a 1 weight percent or 10,000 gel is a gel which was prepared from a starting polymer solution or dispersion which contained 1 weight percent or 10,000 ppm by weight of polymer. The same system is employed for the gels prepared by the above-described dilution technique.

As indicated above, the above-described aqueous gels are particularly useful in fluid drive operations for the secondary recovery of oil. Said gels are applicable for decreasing the mobility of a drive fluid, such as water or other fluids, or decreasing the permeability of nonfractured porous formations prior to or during secondary recovery operations, such as fluid drive processes, and also for water shutoff treatments in producing wells. In such processes the aqueous gels an be injected into the formation prior to or subsequent to another injected fluid. For example, in one particular useful application, a slug of aqueous gel can be injected after a previously injected slug of a fluid such as a detergent and/or oil-containing fluid which serves to loosen the oil from the formation. Said slug of gel can then be followed by water to push both of said slugs toward the production well. In one embodiment of the invention, a conventional waterflood or gas drive is carried out in conventional manner until the drive fluid breaks through into the production well in excessive amounts. An above-described gel is then pumped down the well and into the nonfractured porous formation in any suitable manner, any suitable amount, and for any desired period of time sufficient to obtain the desired in-depth penetration and decrease in mobility of the drive fluid, or decrease in permeability of the high permability zones of said formation. Usually, an in-depth penetration of from 10 to 1,000, preferably 75 to 900, feet from the injection well will be sufficient. However, this can vary from formation to formation and penetrations outside said ranges can be used. For example, there can be injected into the formation via the injection well from about 0.001 to about 0.5 pore volume of a gel in accordance with the invention over a suitable period of time ranging from one day to six months. Or, the injection of the gal can be carried out by injecting a slug of about 200 to 5,000 barrels of gel into the well and then into the formation. Injection in one of the above manners will provide a flood front adjacent the oil to be produced. If desired, an ordinary brine or water can then be employed to drive this slug or band or front of gel on through the formation to the production well. If desired, in order to avoid any sharp demarcations in viscosity or mobility of the gel, which could adversely affect the relative mobility of the flood medium and the oil, and cause channeling, the viscosity or concentration of the gel can gradually be lessened through a series of incremental decreases rather than discontinuing the injection thereof abruptly. Also, if desired, said slug of brine or water can be followed with another slug of gel.

In another embodiment of the invention, the nonfractured porous formation can be treated prior to carrying out the fluid drive secondary recovery operations. This embodiment is particularly applicable where there is a good knowledge of the nature of the formation. Thus, in such a formation where the oil-bearing strata are interspersed with more permeable porous strata which contain no oil, or an insufficient amount of oil to make secondary recovery operations economical, but which more permeable strata would still act as a thief zone, the formation can be treated in accordance with the invention prior to initiating the fluid drive operation.

In still another embodiment, the invention can be applied to producing wells, either oil wells or gas wells, where there is a more porous nonhydrocarbon-bearing strata adjacent the hydrocarbon-bearing strata. For example, such a condition can exist where there is a water sand adjacent the hydrocarbon-bearing sand and the water intrudes into the borehole and interferes with the production of hydrocarbon. In such instances, the formation can be treated in accordance with the invention to shut off the flow of water. The method of carrying out such a water shutoff treatment is substantially the same as described above in connection with fluid drive operations.

In any of the above-described embodiments of the invention, a slug of ungelled polymer can be injected ahead of the aqueous gel. The ungelled polymer can thus be used to satisfy the absorption requirements of the formation, resulting in less absorption and more efficient utilization of the aqueous gel. The initial injection of ungelled polymer also aids in reducing face plugging where this is a problem.

It is also within the scope of the invention to carry out the gel injection techniques of the invention periodically or intermittently, as needed, during the course of a fluid drive secondary operation, or during the production of oil from a producing well.

In all of the above operations, the injection of the gel can be carried out in conventional manner. If desired, a gel of suitable viscosity or concentration can be injected as the drive fluid per se. Gels injected in accordance with the invention can be prepared in advance, stored in suitable tanks, and then pumped into the well. Or, said gels can be formed in a conduit leading to the injection well, or in the tubing in the well itself, and then injected into the formation. Thus, the required amounts of polymer, polyvalent metal compound, and reducing agent can be metered into the tubing in the well, mixed therein, and then injected into the formation. If desired, selected portions of the formation can be isolated mechanically, as by the use of packers, and other means known to the art, for treatment in accordance with the invention.

The above-described aqueous gels can comprise, or can be employed as, drilling fluids in the drilling of wells in any manner known to the art for the use of drilling fluids. Such gels can be employed without the addition of other materials thereto. However, if desired, weighting agents such as barium carbonate, barium sulfate, amorphous silica, etc., can be included in the drilling fluids comprising said aqueous gels. If desired, other additives compatible with the aqueous gels can also be included in the drilling fluid. Thus, the drilling fluids can include clays such as bentonite, attapulgus clay, fluid loss agents, etc. It should be understood that not all of these additives or constituents will necessarily be present in any one drilling fluid and that the amount of any particular additive used will be governed by the other constituents present under the particular well conditions existing. As indicated, in selecting such additives for use in a particular drilling fluid, care should be taken to avoid materials which are not compatible with the aqueous gels. The use of such additives will be governed in part by the viscosity and fluid loss properties desired in the drilling fluid. Thus, as is the situation in connection with conventional drilling fluids, pilot tests should be run to determine the properties desired for the aqueous gel used as the drilling fluid, or an aqueous gel containing one of the above-described additives, to determine the optimum results or properties desired for the drilling fluid under the particular well conditions existing.

Based on the data in the examples set forth hereinafter, low solids drilling fluids comprising the aqueous gels described herein offer several particularly advantageous applications. Such drilling fluids can be used as flush drilling fluids, e.g., where it is desired to clean the hole periodically so that a complete "mud-up" can be delayed. This permits the usual early water drilling and the resulting faster penetration to be extended to a greater depth. In flush drilling operations the initial viscosity at low shear rates (100 and 6 rpm on a Fann VG meter) is important as a measure of carrying capacity. In flush drilling the fluid normally circulates through the hole only once. Such drilling fluids can also be used in normal drilling with controlled properties, e.g., where it is wished to increase viscosity at low shear rates for good carrying capacity and suspending ability.

In the drilling art, low solids drilling fluids are generally considered to include those drilling fluids which contain up to about 5, frequently only up to about 3, volume percent of finely divided clay solids dispersed therein. A wide variety of such clay solids are known in the art and are commercially available. Examples of such clay solids include bentonite, attapulgus clay, the various other montmorillonite clays, P95 rotary clay, and others. Bentonite is the most commonly used clay. Said finely divided solids are preferably ground until at least about 90 percent will pass through a 325 mesh screen. The most commonly used low solids drilling fluids are the water base drilling fluids.

The aqueous gels described herein can be incorporated into said low solids drilling fluids in any suitable amount sufficient to give the desired results, e.g., increase the viscosity of the drilling fluid at low shear rates. For economic reasons it will be desirable to keep the amount of gel used relatively small, commensurate with the results desired in any particular well application. As a guide to those skilled in the art, in most instances the amount of aqueous gel used in said low solids drilling fluids will be in the range of from 0.05 to about 1.5, preferably 0.1 to about 1, pound per barrel of drilling fluid. However, it is within the scope of the invention to use amounts of aqueous gels outside said ranges, depending upon particular well applications.

As shown by the examples given hereinafter, said aqueous gels used in the low solids drilling fluids can be prepared separately and then incorporated into the low solids drilling fluid; or the components necessary for the formation of the gel can be mixed with the other components of the drilling fluid, e.g., water and finely divided solids, and gelation effected in the presence of the finely divided solids. When said gels are prepared separately, they can be prepared by any of the above-described methods. When gelation is effected in the presence of said finely divided solids it is sometimes convenient to express the concentrations of the polymer and the gelling agents in terms of pounds per barrel of drilling fluid in accordance with customary drilling art practice.

In the above description of drilling fluids containing said aqueous gels in accordance with the invention, particular reference has been made to using said gels in low solids drilling fluids. However, the invention is not so limited. Said aqueous gels can also be used, in the same proportions, in drilling fluids which are normally considered high solids fluids in the drilling art. For example, drilling fluids containing up to about 12 volume percent of finely divided solids, or higher. Thus, generally speaking, said aqueous gels can be used in water-base drilling fluids containing sufficient finely divided solids to form a filter cake on the wall of well, e.g., from about 1 to about 12 volume percent, or higher.

The following examples will serve to further illustrate the invention.

EXAMPLE I

A series of runs was made to illustrate the formation of aqueous gels. For these runs a stock solution was prepared by dissolving 6 grams of a substantially linear polyacrylamide in two liters of Bartlesville tap water. Said polyacrylamide was a commercially available material having a molecular weight of about $10 \times 10^6$, a nitrogen content of about 12 weight percent, and was about 21 percent hydrolyzed. The resulting solution contained about 3000 ppm of said polyacrylamide. To individual 200 ml portions of this stock solution there were added varying amounts of a 10 weight percent solution of $Na_2S_2O_4$ in distilled water, with stirring for 10 seconds; and then varying amounts of a 10 weight percent solution of $Na_2Cr_2O_7.2H_2O$ in distilled water, with stirring for 10 minutes. Stable gels were formed in each instance. The results of these test runs are set forth below.

| No. | $Na_2Cr_2O_7 \cdot 2H_2O$ grams | $Na_2S_2O_4$ grams | Apparent Viscosities, cp[1] 1 minute | 48 hours |
|---|---|---|---|---|
| 1 | 0 | 0 | 28 | 30 |
| 2 | 0.025 | 0.025 | 38 | 37 |
| 3 | 0.05 | 0.05 | 49 | 36 |
| 4 | 0.05 | 0.10 | 35 | 56 |
| 5 | 0.10 | 0.10 | 41 | 47.5 |
| 6 | 0.10 | 0.15 | 34 | 53 |
| 7 | 0.15 | 0.15 | 28 | 50 |
| 8 | 0.25 | 0.25 | 42 | 80 |

[1]Model 35, Fann VG meter (300 rpm)

The above data indicate that with increasing amounts of $Na_2Cr_2O_7.2H_2O$, with sufficient reducing agent present to reduce $Cr^{+6}$ to $Cr^{+3}$, the rate of gelation increases. The data also indicate that for a given amount of $Na_2Cr_2O_7.2H_2O$, as the amount of reducing agent present increases, the overall rate of gelation increases.

EXAMPLE II

Water Diversion Test in Ottawa Sand Pack

An ungelled solution of polymer was prepared by adding to Bartlesville tap water 250 ppm of a high molecular weight (about $10 \times 10^6$) partially hydrolyzed polyacrylamide. This polymer has about 21 percent of the carboxamide groups hydrolyzed to carboxyl groups, a nitrogen content of about 12 percent, and when mixed in said water at the above concentration with a magnetic stir plate exhibited a viscosity, 24 hours after mixing, of 3.9 centipoises at a shear rate of 7.3 $sec^{-1}$.

A linear displacement model (sand pack) was prepared as follows. A stainless steel pipe 33 centimeters long having an inside diameter of 2.21 centimeters was filled with Ottawa sand. The sand pack was mounted in a horizontal position, evacuated to remove air, flooded with $CO_2$ gas to further remove any air and evacuated again. The sand pack was then flooded with water to remove all gas and establish a water saturation. The sand pack was then flooded with a refined oil which had a viscosity of 220 centipoises at 75° F. so as to establish an oil saturation and residual connate water saturation condition. The sand pack was then flooded with water for a sufficient period of time to give an exit water-to-oil ratio in excess of 200:1, so as to insure that all mobile oil had been removed therefrom. The sand pack at this point was considered to be in a flooded out state with residual oil saturation.

The thus-prepared linear model (sand pack) had a pore volume of 195 milliliters, a porosity of 37 percent, and a residual oil saturation (Sor) of 0.25. The sand pack was mounted in a horizontal position and provided with a pressure tap located 8.25 centimeters from the inlet end. Water diversion tests were then carried out at room temperature of 75° F. as described below, with all liquids being pumped into the sand pack at said inlet end.

In making water diversion tests with the above-described sand pack, the various liquids are pumped at uniform rates simulating a linear velocity of about 100 feet per day. Pressure readings are taken at the inlet and at the pressure tap located 8.25 centimeters downstream of the inlet. All fluids are discharged out of the sand pack with the exit end exposed to atmospheric pressure. The data obtained are used to calculate mobility values using Darcy's linear flow equation. Said equation can be written as follows:

$$\frac{K}{\mu} = \frac{QL}{A\Delta P}$$

wherein the factor $K/\mu$ represents mobility in millidarcys divided by the viscosity of the liquid, Q represents flow rate in cubic centimeters per second, L represents the length of the column in centimeters, A represents cross-sectional area of the column in square centimeters, and $\Delta P$ represents the differential pressure in atmospheres. Since L and A are constant for any given model, mobility can be readily calculated from $Q/\Delta P$. If desired, in employing the data, mobility values can be plotted as the ordinate versus cumulative volume injected as the abscissa.

In this example, mobility tests were carried out by first introducing a total of 490 milliliters of said water at a uniform velocity of about 100 feet per day. Next, a total of 325 milliliters of the above-described ungelled solution of polyacrylamide containing 250 ppm (0.025 weight percent) was injected at the same rate. This was followed by the injection of another 375 milliliters of said water at the same rate. Next, 290 milliliters of a 250 ppm gelled solution of polyacrylamide was injected at the same rate. This was followed by 1545 milliliters of said water at the same rate. The gelled solution of polymer was prepared by taking one liter of the above-described ungelled solution of polymer and gelling same by adding thereto 35 ppm of sodium hydrosulfite, stirring for 1 minute and then adding 35 ppm of sodium dichromate ($Na_2Cr_2O_7.2H_2O$), followed by stirring. About 10 minutes after the mixture was prepared, injection of the gelled solution of polymer was initiated. The reducing agent (sodium hydrosulfite) and the metal salt (sodium dichromate) were predissolved in distilled water to form 10 percent solutions by weight. Portions of each of these solutions were then added to the ungelled solution of polymer in amounts sufficient to provide 35 ppm of sodium hydrosulfite and 35 ppm of sodium dichromate based upon the weight of the polymer solution. The viscosity of the gelled solution of polymer was 3.7 centipoises at a shear rate of 7.3 $sec.^{-2}$ at 75° F. Results of this test run are set forth in Table I below.

Referring to said Table I, the mobility of the water in the sand pack was initially 13,300 millidarcys per centipoise. The mobility of the ungelled solution of polyacrylamide was 1450 millidarcys per centipoise after the injection of 325 milliliters. The mobility of the second water increment increased from 3900 after 50 milliliters to 7400 millidarcys per centipoise after 300 milliliters, showing that the water was eluting or washing out most of the previously injected ungelled solution of polymer. The ungelled solution of polymer was largely ineffective, reducing the mobility of the water from 13,300 to 7400 millidarcys per centipoise which is equal to a residual resistance factor (RRF) of 1.8 (13,000 ÷ 7400). The mobility of the gelled solution of polyacrylamide decreased from 2800 after 50 milliliters to 1250 millidarcys per centipoise after 290 milliliters, indicating the gelled solution of polymer was partially blocking the flow paths in the sand pack. The mobility of the fnal slug of water increased from 1900 md/cp after 250 milliliters to 3400 md/cp after 1000 milliliters, and remained constant through the injection of 1545 milliliters. The gelled solution of polyacrylamide effectively reduced the water permeability of the sand pack, and was about twice as effective as the ungelled solution of polymer.

From this example, it is evident that the gelled solution of polyacrylamide could be employed to selectively reduce the permeability of the more porous sections of a formation and thus divert flood water to the less porous sections of a formation. This is possible because the gelled solution of polyacrylamide will preferentially enter said more porous sections of the formation.

TABLE I

| Injected | Cumulative Slug Volume of Liquid Injected, ml. | Total Cumulative Volume of Liquid Injected - ml. | Mobility (K/μ) md/cp | RRF |
|---|---|---|---|---|
| Water | 200 | 200 | 13,300 | |
| " | 400 | 400 | 13,300 | |
| " | 490 | 490 | 13,300 | 1.0 |
| Ungelled Polyacrylamide Solution | 50 | 540 | 1,335 | |
| " | 150 | 640 | 1,432 | |
| " | 325 | 815 | 1,450 | 9.2 |
| Water | 50 | 865 | 3,900 | |
| " | 100 | 915 | 5,500 | |
| " | 200 | 1015 | 7,000 | |
| " | 300 | 1115 | 7,400 | |
| " | 375 | 1190 | 7,400 | 1.8 |
| Gelled Polyacrylamide Solution | 50 | 1240 | 2,800 | |
| " | 100 | 1290 | 2,000 | |
| " | 200 | 1390 | 1,500 | |
| " | 250 | 1440 | 1,330 | |
| " | 290 | 1480 | 1,250 | 10.6 |
| Water | 250 | 1730 | 1,900 | |
| " | 500 | 1980 | 2,400 | |
| " | 750 | 2230 | 2,800 | |
| " | 1000 | 2480 | 3,500 | |
| " | 1250 | 2730 | 3,400 | |
| " | 1545 | 3025 | 3,400 | 3.9 |

EXAMPLE III

Water Diversion Test in Ottawa Sand Pack

A gelled solution of polymer was prepared from a solution that initially contained 5000 (0.5 weight percent) parts per million of the high molecular weight polyacrylamide described in Example II. A 5000 ppm ungelled solution of polymer was prepared by adding 5 grams of the polymer to one liter of Bartlesville tap water and stirring on a magnetic stir plate overnight. To 200 milliliters of this solution there was added 800 milliliters of water to form a 1000 ppm ungelled solution of polymer which was used in the water diversion tests described below. A 1000 ppm gelled solution of polymer was prepared by taking 200 ml of the 5000 ppm ungelled solution, diluting with 800 ml of water to obtain a 1000 ppm solution of polymer. This solution was gelled by adding thereto sodium hydrosulfite in an amount equal to one-fifth the weight of the polymer with stirring, and then adding sodium dichromate in an amount equal to one-fifth the weight of the polymer. The resulting gelled solution of polymer contained 1000 ppm of the polyacrylamide, and 200 ppm each of sodium hydrosulfite and sodium dichromate. The sodium dichromate and sodium hydrosulfite which were added to the polymer solution were predissolved in distilled water to form 10 weight percent solutions prior to addition to the polymer solution.

The ungelled and gelled 1000 ppm solutions of polymer were then used to carry out water diversion tests in an Ottawa sand pack prepared essentially as described in Example II above. The sand pack had a pore volume of about 47 milliliters, a porosity of 37 percent and a residual oil saturation (Sor) of about 0.2. In this set of tests, a refined oil having a viscosity of 50 cp at 75° F. was used. The sand pack was waterflooded and then oil flooded to a residual water saturation. The mobility of the oil was measured at a velocity of about 100 feet per day. The sand pack was then waterflooded with 1171 ml of water to a water-to-oil ratio in excess of 100 to 1. The sand pack was then flooded with 206 milliliters of said 1000 ppm ungelled solution of polymer to a stabilized condition. Following this, the sand pack was flooded with 808 ml of water. After this, the sand pack was flooded with 101 ml (approximately two pore volumes) of the 1000 ppm gelled solution of polymer. Next, 711 ml. of water was injected and this was followed by another oil flood of 1105 ml. The pack was flooded with water again to remove the oil and to measure any mobility changes to brine. Throughout the introduction of said liquids, pressure readings were taken at the entrance to the column and at the pressure tap located 8.25 centimeters downstream of the inlet. All the flooding operations were carried out at velocities of about 100 feet per day. Mobility, K/μ, of each liquid in the downstream section, 24.75 centimeters long, was calculated from said injection rate and said pressure readings, as described above in Example I. The results are set forth in Table II below.

The data in Table II below show that the initial oil mobility with residual water present was 305 md/cp and that at a residual oil saturation condition the mobility to water was 7000 md/cp. During injection of the ungelled solution of polymer the mobility decreased to 190 md/cp after 150 ml of injection and remained at that level through 206 ml. Most of the polymer solution was flooded out of the core with brine and the mobility to water increased from 1350 md/cp to 1620 md/cp after 750 ml of injection. The water mobility after the ungelled polymer solution injection was 23.1 percent of the original water mobility, indicating residual effects of the ungelled solution of polymer. About two pore volumes (101 ml) of the 1000 ppm gelled solution of polymer was then injected and the stabilized mobility was 120 md/cp. The mobility to water increased to a stabilized value of 210 md/cp when the gelled solution of polymer was flooded out of the sand pack which is markedly less than the mobility of 1620 md/cp observed after the ungelled solution of polymer. A final oil flood produced an oil mobility of 210 md/cp after the injection of 1105 ml of oil. The sand pack was flooded again with 1350 ml of water and the mobility to water was measured at 475 md/cp. It can be concluded from this experiment that a 1000 ppm ungelled solution of polymer produced an RRF of 4.3 and that a gelled solution of polymer produced an RRF of 14.7 indicating that gelation of the polymer solution increased the water diversion effectiveness by a factor of 3.4. An important fact is that the oil permeability after injection of the gelled solution of polyacrylamide was 69 percent of the original oil permeability while the final water permeability was only 6.8 percent of the original brine permeability.

It can be concluded that gelled solutions of polyacrylamides would be effective as water diversion agents to reduce the permeability to brine of nonfractured porous formations. It is also concluded that gelled solutions of polyacrylamides would be effevctive for treatment of producing wells to reduce the water-oil ratio. The above data indicate that gelled solutions of polyacrylamides would be more difficult to elute out of the formation than ungelled solutions of polymers. Therefore, the use of gelled solutions of polyacrylamides is an improvement over the use of ungelled solutions of polyacrylamides.

TABLE II

| Liquid Injected | Cumulative Slug Volume of Liquid Injected, ml. | Total Cumulative Volume of Liquid Injected, ml. | Mobility (K/μ) md/cp | RRF |
|---|---|---|---|---|
| Oil | 25 | 25 | 305 | |
| " | 50 | 50 | 305 | |
| " | 100 | 100 | 305 | |
| Water | 800 | 900 | 6400 | |
| " | 900 | 1000 | 6500 | |
| " | 1000 | 1100 | 6700 | |
| " | 1100 | 1200 | 7000 | |
| " | 1171 | 1271 | 7000 | 1.0 |
| Ungelled Solution | 50 | 1321 | 170 | |
| " | 100 | 1371 | 185 | |
| " | 150 | 1421 | 190 | |
| " | 200 | 1471 | 190 | |
| " | 206 | 1477 | 190 | 36.8 |
| Water | 150 | 1627 | 1350 | |
| " | 250 | 1727 | 1430 | |
| " | 500 | 1977 | 1520 | |
| " | 750 | 2287 | 1620 | |
| " | 808 | 2285 | 1620 | 4.3 |
| Gelled Solution | 45 | 2330 | 207 | |
| " | 65 | 2350 | 130 | |
| " | 85 | 2370 | 120 | |
| " | 95 | 2380 | 120 | |
| " | 101 | 2386 | 120 | 58.3 |
| Water | 100 | 2486 | 260 | |
| " | 400 | 2786 | 220 | |
| " | 500 | 2886 | 210 | |
| " | 600 | 2986 | 210 | |
| " | 711 | 3097 | 210 | 33.3 |
| Oil | 600 | 3697 | 180 | |
| " | 800 | 3897 | 200 | |
| " | 900 | 3997 | 210 | |
| " | 1105 | 4202 | 210 | 0.69[A] |
| Water | 200 | 4402 | 316 | |
| " | 400 | 4602 | 375 | |
| " | 800 | 5002 | 425 | |
| " | 1150 | 5352 | 455 | |
| " | 1250 | 5452 | 475 | |
| " | 1350 | 5552 | 475 | 14.7 |

[A]The RRF of 0.69 for final oil mobility indicates the mobility to oil after the polymer flood and gelled polymer flood is still 69 percent of the initial oil mobility of 305 md/cp.

EXAMPLE IV

Field Test with a Gelled Solution of Polyacrylamide

A field test using a gelled solution of polyacrylamide for water diversion purposes in a waterflood was conducted wherein a nonfractured porous oil-bearing sand in four water injection wells in a waterflood operation in an Oklahoma field were treated with a gelled solution of a high molecular weight polyacrylamide at polymer concentrations of 250 to 500 parts per million, based upon the weight of the water. The test was conducted in injection wells where channeling through open and conductive fractures to offset producing wells was not a problem based upon fresh water tracer tests run four months prior to the injection of the gelled polyacrylamide.

The injection wells treated were part of a staggered line drive pattern wherein the number of offsetting producer wells is twice the number of the injection wells. The oil-bearing sand in the area of the field treated is about 3000 feet deep and has an average thickness of 37 feet. From reservoir conditions representative of the area, and a reservoir computer model which matched the first nine years of waterflood history, one trained in reservoir engineering would know that waterflood performance in the area would be poor because of an unfavorable variation in the distribution of permeability. The mathematical model, which matched the waterflood performance, indicated 90 percent of the injected water was channeling through 15 percent of the reservoir. The channeling problem resulted in early water "breakthrough" with essentially all of the waterflood oil being produced at high "watercuts".

The treatments with gelled solution of polyacrylamide followed treatment of the four injection wells with volumes of 140,000 to 170,000 barrels per well of ungelled solution of polyacrylamide at polymer concentrations of 250 ppm over a period of about three months. The polymer used in the field tests was identical to the one described in Examples II and III above. The injection of a 250 ppm gelled solution of polyacrylamide was started with the four individual injection wells accepting the gelled solution at rates of 1553 to 1890 barrels per day at surface injection pressures ranging from 5 inches of water vacuum to 0 psig. After five days the concentration of the gelled polymer solution was increased to 500 ppm.

The gelled solutions of polymer were prepared in the following manner: (1) To a stream of 750 barrels per day of field brine (total dissolved solids of approximately 1000 parts per million) there was added 610 pounds per day of a high molecular weight polyacrylamide using a polymer mixing unit. Said polyacrylamide was like that described in Example II. Prior to addition of the polymer, 15 pounds per day of a reducing agent, sodium hydrosulfite, was added to the 750 barrel per day stream of brine. (2) Downstream of the polymer mixing unit, the polymer solution containing the reducing agent was diluted with 6250 barrels per day of additional brine to form a 250 ppm polymer solution. (3) Immediately downstream of the dilution point, 50 pounds per day of sodium dichromate ($Na_2Cr_2O_7.2H_2O$) was added to the polymer solution. Crosslinking of the polymer molecules and gelation was initiated upon addition of the sodium dichromate. Concentration of the various chemicals at the time of injection into the four wells was 250 ppm of polymer, 6 ppm of sodium hydrosulfite and 20 ppm of sodium dichromate. Table III below presents a summary of the polymer and crosslinking agents that were injected into the wells during the test run.

It was concluded from the test results shown in Table III below that gelled solutions of polyacrylamides prepared on the surface can be injected into nonfractured porous media at dilute polymer concentrations. There was no excessive plugging of the well bores and surface injection pressures at the individual wells before and after the treatment was relatively unchanged.

TABLE III

| Date | Approx. Total Volume of Brine Injected into Four Wells, Barrels | Polymer Concentration ppm | Concentration of Sodium Hydrosulfite, ppm | Concentration of Sodium Dichromate, ppm |
|---|---|---|---|---|
| 1st day | 7,000 | 250 | 6 | 20 |
| 2nd day | 7,000 | 250 | 6 | 34 |
| 3rd day | 7,000 | 250 | 6 | 34 |
| 4th day | 7,000 | 250 | 18 | 28 |
| 5th day | 7,000 | 500 | 18 | 28 |
| 6th day | 7,000 | 500 | 18 | 28 |
| 7th day | 7,000 | 500 | 4 | 61 |

EXAMPLE V

Field Test with Gelled Solution of Polyacrylamide

A second field test with a gelled solution of polyacrylamide was conducted wherein each of the injection wells described in Example IV above were retreated with a solution of gelled polyacrylamide having higher concentrations. The polymer used was identical to that described in Example II.

The data in Table IV below sets forth individual well treatments and the surface injection pressures before and after the treatments. Gelation of the polymer solution was accomplished in the manner described in Example IV. The wells were treated individually at injection rates of 2000 barrels per day. Crosslinking and gelation of the polymer solution was accomplished by adding, on a polymer weight basis, one part of sodium hydrosulfite and one part of sodium dichromate for each five parts of polymer.

TABLE IV

Treatment of Injection Wells with a Gelled Solution of Polyacrylamide

| Well No. | Amount of Polymer lbs. | Volume of Mixing Water, bbls | Concentration of Polymer, ppm | Injection Rate & Surface Injection Pres. Prior to Treatment | | Injection Rate & Surface Injection Pres. 4 Days After Treatment | | Injection Rate & Surface Injection Pres. 37 Days After Treatment | | Injection Rate & Surface Injection Pres. 55 days After Treatment | |
|---|---|---|---|---|---|---|---|---|---|---|---|
| | | | | BWPD | Pressure psig | BWPD | Pressure psig | BWPD | Pressure psig | BWPD | Pressure psig |
| 49-W25 | 875 | 2000 | 1250 | 1920 | (vacuum) | 1740 | 120 | 1784 | 130 | 1810 | 123 |
| 49-W27 | 1575 | 2250 | 2000 | 1716 | (vacuum) | 1670 | 150 | 1475 | 138 | 1464 | 135 |
| 40-W23 | 1350 | 2250 | 1710 | 1730 | (vacuum) | 1810 | 130 | 1780 | 128 | 1857 | 118 |
| 40-W21 | 1000 | 1350 | 2120 | 1630 | 10 | 1780 | 120 | 1835 | 113 | 1870 | 105 |
| | — | | | — | | — | | — | | — | |
| | 4800 | | | 7000 | | 7000 | | 6875 | | 7001 | |

It is apparent from the higher surface injection pressures produced by the treatments in Table IV that the treatments were successful in reducing the permeability in the well bore area. Prior to the treatments, three of the injection wells were taking water on a vacuum while the fourth well had an injection pressure at the surface of 10 psig. Face plugging was not a problem during the treatments and a slow gradual buildup in surface injection pressure was observed during the treatments indicating the gelled polymer solution was penetrating into the porous zones of the sandstone formation. The maximum surface pressure observed was 210 psig on Well 49-W27 during injection of the gelled polymer solution at a rate of 2000 barrels per day. Well 49-W27 experienced a decrease of 19 percent in its injectivity index which was evidenced by separate measurements of the injection bottom hole pressure before and after treatment.

EXAMPLE VI

To illustrate the effect that gelation has on viscosity, two ungelled solutions of polymer were prepared in the laboratory at polymer concentrations of 1500 and 2500 ppm in a field brine containing about 1000 ppm dissolved solids. After being mixed 24 hours the 1500 ppm ungelled solution exhibited a viscosity of 6 centipoises at a shear rate of 500 $sec^{-1}$ on a Fann viscometer, and the 2500 ppm ungelled solution of polymer exhibited a viscosity of 13.5 centipoises. The two solutions of polymer were then gelled by adding thereto 300 ppm of sodium hydrosulfite and 300 ppm of sodium dichromate in 10 percent solutions to the 1500 ppm polymer solution; and 500 ppm of $Na_2S_2O_4$ and 500 ppm of $Na_2Cr_2O_7.2H_2O$ in 10 percent solutions to the 2500 ppm polymer solution. On a polymer weight basis, the addition of each of the crosslinking agents is equivalent to one part of each per five parts polymer, which is the same ratio used in the above field tests. The viscosity of the 1500 ppm polymer solution increased from 6 to 12 centipoises upon gelation while the viscosity of the 2500 ppm polymer solution increased from 13.5 to 80 centipoises. The gelled solutions were allowed to stand for 80 hours at room temperature of 75° F. It is clear that gelation of the polymer solution provides a definite advantage over ungelled polymer solutions when higher viscosities of displacing fluid are desired.

EXAMPLE VII

This example illustrates the utility of the aqueous gels of the invention as drilling fluids. Three drilling fluids were prepared and the viscosities thereof adjusted to be essentially the same at a shear rate of 511 reciprocal seconds (300 rpm on a Model 35, Fann VG meter). Thus, the viscosity behavior of all three fluids could be compared at shear rates above and below 511 reciprocal seconds. Each of said fluids was prepared by sifting the dry components thereof into 280 ml of distilled water while stirring at low speed on a Hamilton Beach malt mixer. All fluids were then stirred 10 minutes with a Multimixer. The viscosities were then adjusted by dilution with water to be essentially the same as the viscosity of the lowest viscosity fluid. Final compositions of the fluids were as follows:

A. Dispersed bentonite fluid = 33 ppb (pounds per barrel) of bentonite, 3.3 ppb of ferrochrome lignosulfonate, and 0.943 ppb of NaOH, in Bartlesville tap water.

B. Polyacrylamide fluid = 1.75 ppb of a substantially linear polyacrylamide having a degree of hydrolysis of about 21 percent and a nitrogen content of about 11.9 percent, in Bartlesville tap water.

C. Gelled Polyacrylamide fluid = 1.69 ppb of said polyacrylamide, 0.483 ppb of $Na_2Cr_2O_7.2H_2O$, and 0.483 ppb of $Na_2S_2O_4$, in Bartlesville tap water. This gel thus contained about 0.48 weight percent or 4800 ppm of said polyacrylamide. Viscosity values at different shear rates and gel strength values were then determined on each of the three fluids. The results of these tests are set forth in Table V below.

TABLE V

| Fluid | Fann Deflection Reading, at stated shear rate* | | | | | | Gels | |
|---|---|---|---|---|---|---|---|---|
| Shear rate, $sec^{-1}$ | 1022 | 511 | 341 | 170 | 10.2 | 5.1 | 10 sec. | 10 sec. |
| Fann, rpm | 600 | 300 | 200 | 100 | 6 | 3 | | |
| A | 63 | 34 | 24 | 13 | 0 | 0 | 0 | 1 |
| B | 43 | 33 | 28 | 21 | 8 | 6 | 8 | 9 |
| C | 51 | 35 | 28 | 19 | 3 | 2 | 2 | 2 |

*Fann Apparent Viscosity = $\frac{300 \times \text{deflection (direct reading)}}{\text{rpm}}$ for spring constant F = 1, and R1–B1 rotor-bob combination, standard for drilling fluid testing. Fann VG meter constants for Model 35:

Shear stress, dynes/cm² = 5.077 times deflection
Shear rate, reciprocal seconds - 1.704 times rpm $$\text{Apparent viscosity, cp} = \frac{\text{Shear stress, dynes/cm}^2}{\text{Shear rate, sec}^{-1}} \times 100$$

The data in the above Table V show that the gelled polyacrylamide solutions have utility as drilling fluids. Said data show that the gelled solution of polyacrylamide (Fluid C) has a lower apparent viscosity at high shear rates (600 rpm) than does the bentonite drilling fluid (Fluid A). This property will facilitate penetration of the drilling bit because penetration rate is normally considered an inverse function of apparatus viscosity at high shear conditions. Thus, based on these data, the gelled polyacrylamide solution drilling fluids of the invention will permit higher drilling rates than the ordinary bentonite drilling fluid. Said data also show that the gelled solution of polyacrylamide has a higher apparent viscosity at the lower shear rates (100, 6, and 3 rpm) than does the bentonite drilling fluid. Thus, based on these data, the gelled polyacrylamide solution drilling fluid will permit at least as good, or better, suspension of solids in the annulus for cleaning of the borehole as will the bentonite drilling fluid. This conclusion is confirmed by the data on the gels.

EXAMPLE VIII

This example illustrates the utility of the aqueous gels of the invention in low solids drilling fluids. A base low solids drilling fluid containing 10 ppb (pounds per barrel) of P95 Rotary clay and 10 ppb of bentonite in Bartlesville tap water was prepared in conventional manner. A base solution containing 0.5 percent (500 ppm) of the same polyacrylamide as in Example VII was also prepared, using Bartlesville tap water. Sample drilling fluid No. 1 was prepared by mixing 240 ml. of said base low solids drilling fluid and 40 ml. of said base polyacrylamide solution. Sample drilling fluid No. 2 was prepared by mixing 240 ml. of said base low solids drilling fluid and 40 ml. of said base polyacrylamide solution, and then mixing therewith sufficient $Na_2Cr_2O_7.2H_2O$ (10% solution) and $Na_2S_2O_5$ (5% solution) to crosslink said polyacrylamide and cause gelation. Sample drilling fluid No. 3 was prepared similarly as No. 2 except that the 40 ml. of base polyacrylamide solution was gelled before being mixed with the base low solids fluid. Sample drilling fluid No. 4 was prepared by mixing 200 ml. of said base low solids drilling fluid and 80 ml. of said base polyacrylamide solution, and sufficient of said $Na_2Cr_2O_7.2H_2O$ and said $Na_2S_2O_5$ solutions to crosslink said polyacrylamide and cause gelation. The resultant concentrations of said sample drilling fluids are given in Table VI below.

TABLE VI

| Fluid No. | Bentonite ppb | P95 Clay ppb | Polymer ppb | $Na_2Cr_2O_7 \cdot 2H_2O$ ppb | $Na_2S_2O_5$ ppb |
|---|---|---|---|---|---|
| 1 | 8.57 | 8.57 | 0.25 | 0 | 0 |
| 2 | 8.57 | 8.57 | 0.25 | 0.048 | 0.048 |
| 3 | 8.57 | 8.57 | 0.25 | 0.08 | 0.08 |
| 4 | 6.29 | 6.29 | 0.50 | 0.16 | 0.16 |

Viscosity values at different shear rates and gel strength values were then determined on each of said drilling fluids. The results of these tests are set forth in Table VII below.

TABLE VII

| Fluid | Apparent Viscosity, cp. v. shear rate | | | | | | Gels | |
|---|---|---|---|---|---|---|---|---|
| | Shear rate, $sec^{-1}$ | 1022 | 511 | 341 | 170 | 10.2 | 5.1 | 10 sec. | 10 min. |
| | Fann, rpm | 600 | 300 | 200 | 100 | 6 | 3 | | |
| | Initial Tests | | | | | | | | |
| 1 | | 18 | 18 | 19.5 | 24 | 50 | 0 | 1 | 2 |
| 2 | | 27 | 29 | 37.5 | 51 | 150 | 150 | 3 | 9 |
| 3 | | 33.5 | 46 | 52.5 | 66 | 200 | 250 | 3 | 6 |
| 4 | | 40 | 52 | 64.5 | 69 | 325 | 500 | 15 | 50 |
| | Tests Repeated after Shearing (10 min. Stirring on Multimixer) | | | | | | | | |
| 1 | | 8 | 9.5 | 10.5 | 10.5 | 0 | 0 | 0 | 0 |
| 2 | | 8.3 | 9.5 | 10.5 | 12 | 0 | 0 | 0 | 5 |
| 3 | | 10 | 12.5 | 14.3 | 16.5 | 0 | 0 | 0 | 2 |
| 4 | | 13.8 | 17.5 | 21 | 30 | 75 | 50 | 2 | 18 |
| | Let Fluids Set 3 Hours & Retested Without Agitation | | | | | | | | |
| 1 | | 11.5 | 14 | 15 | 18 | 0 | 0 | 0 | 0 |
| 2 | | 14.5 | 18 | 21 | 27 | 50 | 50 | 1 | 5 |
| 3 | | 14 | 16 | 19.5 | 24 | 50 | 0 | 1 | 3 |
| 4 | | 29 | 40 | 48 | 69 | 250 | 300 | 5 | 9 |
| | Fluids Aged 18 Hours More & Retested Without Agitation | | | | | | | | |
| 1 | | 13 | 15 | 16.5 | 18 | 0 | 0 | 0 | 0 |
| 2 | | 16.5 | 21 | 24.8 | 30 | 100 | 100 | 1 | 4 |
| 3 | | 16 | 20 | 21 | 27 | 0 | 0 | 0 | 2 |
| 4 | | 31 | 41 | 48.5 | 66 | 250 | 300 | 5 | 9 |

The data in the above Table VII show that the gelled polyacrylamide solutions also have utility when used in drilling fluids having clay solids dispersed therein, e.g., low solids drilling fluids. Said data show that low solids drilling fluids Nos. 2, 3, and 4 which had gelled polyacrylamide solution incorporated therein were, in general, more shear thinning than low solids drilling fluid No. 1 which had ungelled polyacrylamide solution incorporated therein. This is a desirable property in that it will permit higher penetration rates. Said drilling fluids Nos. 2, 3, and 4 behave more like a Bingham plastic fluid at low shear rates than does said drilling fluid No. 1. Said drilling fluids Nos. 2, 3, and 4 have higher gel strengths and are more thixotropic than said drilling fluid No. 1. Thus, based on these data, said drilling fluids 2, 3, and 4 would be superior to drilling fluid No. 1 in suspending cuttings during interruptions in drilling operations. Drilling fluids Nos. 2 and 3 show that the aqueous gels can be formed in the presence of the clay solids as in drilling fluid No. 2, or can be prepared separately and then added to the low solids fluid as in drilling fluid No. 3.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

What is claimed is:

1. In a method for drilling a borehole into the earth wherein a drill bit is actuated in said borehole and penetrates a subterranean formation in the presence of a drilling fluid, and said drilling fluid, together with formation solids entrained therein, is removed from said borehole, the improvement wherein said drilling fluid comprises an aqueous gel, and wherein said gel comprises water *having an initial total dissolved solids of not greater than about 40,000 ppm by weight* to which there has been added:

a water thickening amount of a water-dispersible polymer selected from the group consisting of: polyacrylamides and polymethacrylamides wherein up to about 75 percent of the carboxamide groups can be hydrolyzed to carboxyl groups; crosslinked polyacrylamides and crosslinked polymethacrylamides wherein up to about 75 percent of the carboxamide groups can be hydrolyzed to carboxyl groups; polyacrylic acid and polymethacrylic acid; polyacrylates, polymers of N-substituted acrylamides wherein the nitrogen atoms in the carboxamide groups can have from 1 to 2 alkyl substituents which contain from 1 to 4 carbon atoms; copolymers of acrylamide with another ethylenically unsaturated monomer copolymerizable therewith, sufficient acrylamide being present in the monomer mixture to impart said water-dispersible properties to the resulting copolymer when it is mixed with water, and wherein up to about 75 percent of the carboxamide groups can be hydrolyzed to carboxyl groups; and mixtures of said polymers;

a sensible amount of a water-soluble compound of a polyvalent metal wherein the metal present is capable of being reduced to a lower polyvalent valence state and which is sufficient to gel said water when the valence of at least a portion of said metal is reduced to said lower valence state; and an amount of a water-soluble reducing agent which is effective to reduce at least a portion of said metal to said lower valence state.

2. A method according to claim 1 wherein said aqueous gel comprises water to which there has been added:

from 0.0025 to 5 weight percent of said polymer, based upon the weight of said water;

from 0.05 to 60 weight percent of said polyvalent metal compound based upon the weight of said polymer; and from 0.1 to at least about 200 percent of the stoichiometric amount of said reducing agent required to reduce said polyvalent metal to said lower polyvalent valence state.

3. A method according to claim 2 wherein:

said polymer is a substantially linear polyacrylamide;

said polyvalent metal compound is sodium dichromate; and said reducing agent is sodium hydrosulfite.

4. A method according to claim 2 wherein: said polymer is a substantially linear polymer of acrylamide.

5. A method according to claim 4 wherein said compound of a polyvalent metal is a compound of chromium wherein the valence of the chromium is +6 and the valence of at least a portion of said chromium is reduced to +3.

6. A method according to claim 5 wherein said chromium compound is selected from the group consisting of ammonium chromate, ammonium dichromate, the alkali metal chromates and dichromates, chromium trioxide, and mixtures thereof.

7. A method according to claim 6 wherein said reducing agent is selected from the group consisting of hydroquinone, sodium sulfide, sodium hydrosulfite, sodium metabisulfite, potassium sulfite, sodium bisulfite, potassium metabisulfite, sodium sulfite, sodium thiosulfate, ferrous sulfate, hydrogen sulfide, ferrous chloride, p-hydrazinobenzoic acid, hydrazine phosphite, hydrazine dihydrochloride, and mixtures thereof.

8. A method according to claim 7 wherein:

said polyvalent metal compound is sodium dichromate or potassium dichromate; and said reducing agent is selected from the group consisting of sodium metabisulfite, potassium metabisulfite, sodium hydrosulfite, potassium hydrosulfite, and mixtures thereof.

9. A method according to claim 1 wherein said drilling fluid is a water base low solids drilling fluid comprising, in addition to said aqueous gel, up to about 5 volume percent of finely divided clay solids.

10. A method according to claim 9 wherein said drilling fluid contains from 0.05 to about 1.5 pounds of said aqueous gel per barrel of said drilling fluid.

11. A method according to claim 9 wherein the amount of said aqueous gel contained in said drilling fluid is within the range of from 0.1 to 1 pound per barrel of said drilling fluid.

12. A method according to claim 9 wherein said aqueous gel comprises water to which there has been added:

from 0.0025 to 5 weight percent of said polymer, based upon the weight of said water;

from 0.5 to 30 weight percent of said polyvalent metal compound, based upon the weight of said polymer; and from 0.5 to about 200 percent of the stoichiometric amount of said reducing agent required to reduce said polyvalent metal to said lower polyvalent valence state.

13. A method according to claim 12 wherein:

said polymer is a substantially linear polymer of acrylamide;

said compound of a polyvalent metal is a compound of chromium wherein the valence of the chromium is +6 and the valence of at least a portion of said chromium is reduced to +3, and said chromium compound is selected from the group consisting of ammonium chromate, ammonium dichromate, the alkali metal chromates and dichromates, chromium trioxide, and mixtures thereof; and said reducing agent is selected from the group consisting of hydroquinone, sodium sulfide, sodium hydrosulfite, sodium metabisulfite, potassium sulfite, sodium bisulfite, potassium metabisulfite, sodium sulfite, sodium thiosulfate, ferrous sulfate, hydrogen sulfide, ferrous chloride, p-hydrazinobenzoic acid, hydrazine phosphite, hydrazine dihydrochloride, and mixtures thereof.

14. A method according to claim 13 wherein:

said drilling fluid is a water base low solids drilling fluid comprising, in addition to said aqueous gel, up to about 5 volume percent of finely divided clay solids; and said drilling fluid contains from 0.05 to about 1.5 pounds of said aqueous gel per barrel of said drilling fluid.

* * * * *